April 1, 1969 L. H. FRICKE, JR 3,436,673

CONVERTER CIRCUIT

Filed Nov. 22, 1965

INVENTOR
LOUIS H. FRICKE, JR.
BY
Robert J. Schaap
ATTORNEY

United States Patent Office 3,436,673
Patented Apr. 1, 1969

3,436,673

CONVERTER CIRCUIT

Louis H. Fricke, Jr., Maplewood, Mo., assignor to Monsanto Company, St. Louis, Mo., a corporation of Delaware Filed Nov. 22, 1965, Ser. No. 509,101
Int. Cl. H03f 1/14
U.S. Cl. 330—51 13 Claims

ABSTRACT OF THE DISCLOSURE

A converter circuit for providing a load-independent voltage output and a load-independent current output. The circuit comprises an operational amplifier having a negative feedback circuit with a resistance included therein connected across the amplifier. A positive feedback circuit also having a resistance characteristic therein is connected across the amplifier. A type of sensing resistor is connected to the output of the amplifier for detecting the summation of the input voltage and the feedback voltage passing through the amplifier and thereby providing a load-independent current output. A switch is included in the circuit for shunting the positive feedback path and the sensing resistor in order to obtain a load-independent voltage output when the switch is in one position. As a second embodiment of the present invention, a second amplifier may be included in the feedback circuit.

This invention relates in general to certain new and useful improvements in converter circuits and more particularly to a circuit for providing a load-independent voltage output and a load-independent current output.

Today, there are a number of commercially available power supplies which are capable of providing a range of current outputs and a range of voltage outputs. These power supplies are generally designed for electrical connection to some available standard source of electrical current, such as 110–115 volt power sources, 220 volt power sources, 440 volt power sources, etc. However, these power supplies are not particularly accurate and are, therefore, not adaptable as converter circuits in operations requiring a high degree of accuracy, such as analogue computers and the like. Moreover, the presently available power supplies are only adaptable for operation on standard sources of input power such as power sources having the above-mentioned voltage readings. Furthermore, they are not adaptable for providing load independent current outputs and load independent voltage outputs on the basis of any type of input signal.

It is, therefore, the primary object of the present invention to provide a converter circuit which is capable of providing a load-independent voltage output and a load-independent current output.

It is another object of the present invention to provide a converter circuit of the type stated which is highly reliable and has a high degree of accuracy.

It is also an object of the present invention to provide a converter circuit of the type stated which is capable of providing both constant current and constant voltage outputs, which are independent of any load changes.

It is a further object of the present invention to provide a converter circuit of the type stated which is characterized by simplicity and can be built into a small compact unit.

With the above and other objects in view, my invention resides in the novel features of form, construction, arrangement and combination of parts presently described and pointed out in the claims.

Figure 1:
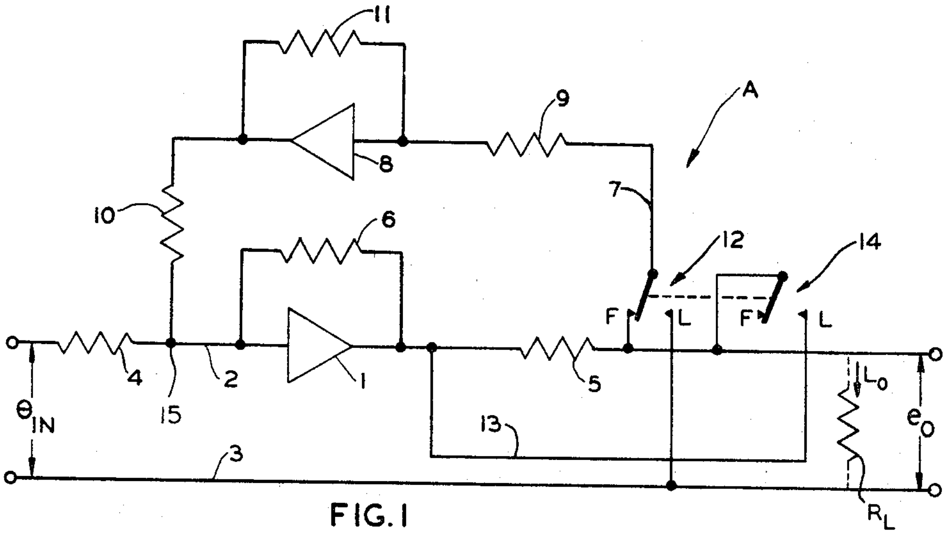
Figure 2:
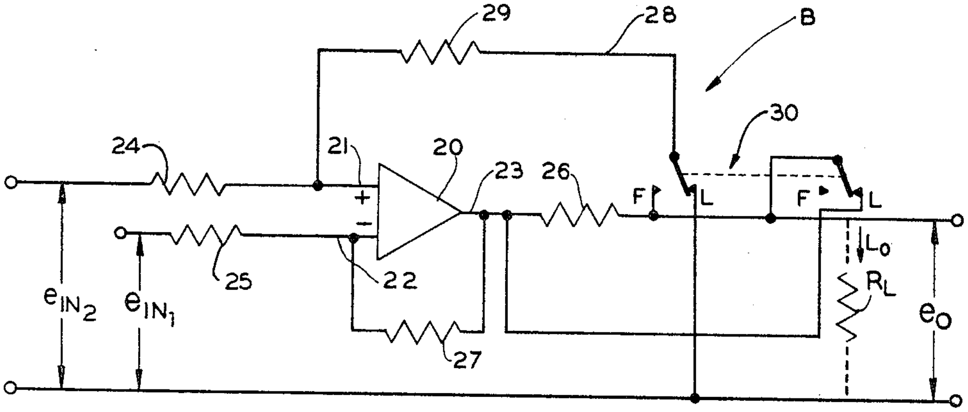

In the accompanying drawings:

FIGURE 1 is a schematic diagram of a converter circuit constructed in accordance with and embodying the present invention; and FIGURE 2 is a schematic view of a modified form of converter circuit which is constructed in accordance with and embodying the present invention.

Generally speaking, the converter circuit includes an operational amplifier of high gain having a resistive negative feedback in combination with a switch for connecting a second unity gain operational amplifier in a positive feedback relationship to the first operational amplifier. When the switch is in a first position, the circuit is a conventional unity gain operational amplifier where the voltage output is independent of load impedance. However when the switch is thrown to the opposite position, a positive feedback path including the second operational amplifier is inserted into the circuit. As a result, the output current is now independent of the load impedance.

Referring now in more detail and by reference characters to the drawings which illustrate practical embodiments of the present invention, A designates a converter circuit substantially as illustrated in FIGURE 1. The converter circuit A generally comprises a high gain operational amplifier 1 connected across conductors 2, 3 which are, in turn, connected to a suitable source of electrical power (not shown). Connected to the input of the amplifier 1 is an input resistor 4 and connected to the output of the amplifier 1 is an output resistor 5. Similarly connected across the amplifier 1 is a feedback resistor 6. This portion of the circuit shows the operation of a typical operational amplifier wherein the output voltage is dependent only on the input voltage and ratio of feedback to input impedances. The transfer characteristics of this amplifier can, therefore, be written by the equation $$E_{out} = -E_{in}\frac{Z_f}{Z_{in}}$$

The load connected across the conductors 2, 3 can be conveniently represented by the resistor $R_L$ substantially as illustrated in FIGURE 1. At this point, it can be seen that the voltage output of the circuit thus far described is completely independent of any changes in the load $R_L$.

A positive feedback line 7 is connected across the amplifier 1 so that one terminal is in effect connected to the input of the amplifier 1 and the opposite terminal of the line 7 is connected to a point beyond the resistor 5 in the manner as shown in FIGURE 1. A second high gain operational amplifier 8 is also inserted in the positive feedback line 7 and is provided with an input resistor 9, and an output resistor 10. The amplifier 8 is connected in such a manner so that the input thereof is connected through the resistor 9 to the output of the amplifier 1. Moreover, the amplifier 8 is connected through the resistor 10 so that the output of the amplifier 8 is, in effect, connected to the input of the amplifier 1. A feedback resistor 11 is also connected across the amplifier 8 in the manner as shown in FIGURE 1.

A two-position switch 12 is also interposed in the positive feedback line 7 and having a feedback position F, that is the left position in FIGURE 1, and a shunt position L, that is the right position in FIGURE 1. When the blade of the switch 12 is shifted to the feedback position F, the positive feedback loop is included within the circuit and when the blade of the switch 12 is shifted to the shunt position L, the positive feedback line 7 is omitted from the circuit. The contact of the shunt position L is connected to the conductor 3 in the manner as illustrated in FIGURE 1. A shunting line 13 with a two-position switch 14 is connected across the resistor 5. The switch 14 is mechanically connected to and actuable by the switch 12 so that the two switches are unitarily actuated. The switch 14 has two contacts, one of which is open when the switch 12 is shifted to the "feedback" position F, and the other of which shunts the resistor 5 from the primary circuit when the switch 12 is shifted to the "shunt" position L. Thus when the blade of the switch 12 is shifted to the shunt position L, the output resistor 5 is shunted and thereby effectively eliminated from the circuit and when the blade of the switch 12 is shifted to the "feedback" position, the resistor 5 is included in the primary circuit.

In use, when the switch 12 is thrown to the feedback position, the positive feedback path including the unity gain operational amplifier 8 is inserted in the circuit so that output current is independent of load impedance. When the switch 12 is shifted to the shunt position L, the positive feedback path is eliminated and the resistor 5 is shunted from the circuit, thereby providing a voltage output which is independent of load impedance. By further reference to FIGURE 1, it can be seen that the amplifier 1 and resistors 4 and 5 form a summer-inverter circuit. Similarly, the amplifier 8 and resistors 9 and 10 form an inverter circuit. It can be seen that the positive feedback line is connected to the input of the amplifier 1 at a summing junction 15. By the addition of the resistor 10 at the summing junction 15, the first inverter with the amplifier 1 becomes a summer. The resistor 5 through the upper inverter circuit provides a positive feedback path to the lower inverter circuit. Thus if $R_L$ were of zero resistance, there would be no positive feedback through the upper inverter circuit and thus the current through the resistor 5 would be equal to a quantity minus the input voltage divided by the resistance of the resistor 5. On the other hand, if $R_L$ were of large magnitude, then the positive feedback path through the upper inverter circuit would approximately equal the negative feedback across the resistor 6 and this would cause the output voltage to the amplifier 1 to increase until the same value of the current is achieved through the resistor 5. Accordingly, it can be seen that when the switch 12 is shifted to the feedback position F, a positive feedback path through the amplifier 8 is inserted into the circuit with the result that the output current is independent of load impedance and is dependent only on the input voltage. Moreover, when the switch 12 is shifted to the shunt position L, the feedback path through the feedback line 7 and the resistor 5 are eliminated from the circuit, thereby providing a constant voltage output where the voltage is independent of the load impedance through the resistor $R_L$.

It is possible to provide a modified form of converter circuit B, substantially as shown in FIGURE 2 and which comprises a differential amplifier 20 having a positive input terminal 21, a negative input terminal 22, and an output terminal 23. The positive input terminal 21 and the negative input terminal 22 are connected through input resistors 24, 25 to the positive and negative terminals, respectively, of an input voltage supply source (not shown). The input terminal 22 is also connected to an input resistor 24. The output of the amplifier 20 is connected through the output terminal 23 to an output resistor 26. A negative feedback loop is also connected across the amplifier 20 and includes a resistor 27 connected to the output terminal 23 and to the negative input terminal 22 of the amplifier 20. A positive feedback loop 28 is also connected across the amplifier B in such a manner that one terminal of the loop 28 is connected to the terminal of the resistor 26 opposite the amplifier 20 and the other terminal of the feedback loop 27 is connected to the positive input terminal 21 of the amplifier 20. A positive feedback resistor 29 is also included in the positive feedback loop 28.

A two-position switch 30 is also included in the positive feedback loop 28 and has a feedback position F with a contact connected to the output of the resistor 26 and an open or shunt position L with a contact connected to the ground wire 31. When in the feedback position F, the switch 30 is designed to include the feedback loop 28 in the entire circuit, and when the switch 30 is shifted to the open position L, the feedback loop 28 is grounded through the wire 31, thereby effectively eliminating the feedback loop 28 from the circuit. Connected in unison with or "ganged" with the switch 30 is a second two-position switch 32. The first contact of the switch 32 is a "dead" or open contact and the second contact is connected to the output side of the amplifier 20 in the manner as illustrated in FIGURE 2, thereby shunting the resistor 25. It can be seen that when the switch 30 is shifted to the open position L, the blade of the switch 30 is shifted to the position where the resistor 26 is effectively removed from the circuit, and when the switch 30 is shifted to the feedback position F where the loop 28 is included in the circuit, the resistor 26 is also included within the circuit.

Thus when the switch 30 is shifted to the open position L, the circuit becomes a conventional unity gain operational amplifier where the voltage output is independent of the load impedance. When the switch 30 is shifted to the open position, the output resistor 26 is also eliminated from the circuit. However, when the switch 30 is shifted to the feedback position F, the positive feedback loop 28 is inserted in the circuit so that the output current is independent of the load impedance.

It can be seen that the converter circuits A and B operate in similar manner except that the converter circuit B employs a differential amplifier 20 which eliminates the employment of the additional feedback amplifier 8 in the circuit A.

The invention is further illustrated by but not limited to the following example.

EXAMPLE 1

The circuit of FIGURE 1 was constructed in order to determine the operational characteristic of the converter. Each of the operational amplifiers 1 and 8 was a conventional high gain amplifier having a gain of at least 50,000. The resistors 6, 9, 10 and 11 each had a value of $10^6$ ohms.

In order to determine the characteristics of the circuit, the values of the input resistor 4 and the values of the output resistor 5 to the amplifier 1 were varied with the input voltage $E_{in}$. Various determinations are set forth in Table I where the switch 12 was in the feedback position. For the various values of the input voltage, and input and output resistance to the amplifier 1, the output current, the load resistance and the output voltage was determined. Each of these values is set forth in Table I.

TABLE I.—SWITCH IN FEEDBACK POSITION

| $e_{in}$ (volts) | $R_{in}$ (megohms) | $R_s$ (ohms) | $L_o$ ($M_a$) | $R_L$ (ohms) | $e_o$ (volts) |
|---|---|---|---|---|---|
| +1.00 | 1.0 | 1,000 | −1.00 | 2,500 | −25.0 |
| −1.63 | 1.0 | 1,000 | +1.63 | 500 | +8.15 |
| +10.39 | 1.0 | 1,000 | −10.39 | .1 | −.0104 |
| −10.0 | 2.0 | 1,500 | +3.34 | 100 | +.333 |
| +2.5 | 2.0 | 100 | −12.5 | 10,000 | −125 |
| +4.0 | 2.0 | 100 | −15.85 | 10,000 | [1] −158.5 |
| +2.0 | .1 | 100 | −48.2 | 100 | [2] −4.82 |

[1] Exceeded permissible amplifier voltage range.
[2] Exceeded permissible amplifier current range.

The switch 12 was then shifted to the "shunt" position and the values of the input resistor 4 and the output resistor 5 to the amplifier 1 were again varied with the input voltage. For these varied inputs, the current output, the load resistance and the output voltage were determined. These data are set forth in Table II.

TABLE II.—SWITCH IN SHUNT POSITION

| $e_{in}$ (volts) | $R_{in}$ (megohms) | $R_s$ (ohms) | $L_o$ ($M_a$) | $R_L$ (ohms) | $e_o$ (volts) |
|---|---|---|---|---|---|
| 1.00 | 1.0 | 0 | −.25 | 2,500 | −1.00 |
| −1.5 | 1.0 | 0 | 3.0 | 500 | +1.5 |
| +10.2 | 1.0 | 0 | −48.7 | 10 | [1] −.49 |
| −10.5 | 2.0 | 0 | +5.25 | 1,000 | +5.25 |
| +2.5 | 2.0 | 0 | −.125 | 10,000 | −1.25 |
| +4.0 | 2.0 | 0 | −20.0 | 100 | −2.0 |
| +2.0 | .1 | 0 | −2.0 | 10,000 | −20 |

[1] Exceeded permissible amplifier current range.

From the above, it can be seen that when the switch is in this feedback position, the current output is independent of the load resistance and when the switch is in the shunt position, the voltage output is independent of the load impedance.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. A converter circuit for providing either a load-independent voltage output or a load-independent current output, said circuit comprising a differential amplifier, a negative feedback path established across said amplifier, a positive feedback path across said amplifier, said amplifier having a positive input terminal connected to said positive feedback path and a negative input terminal for operative connection to an input voltage, and a switch operatively connected to said positive feedback path and having a first and second position, said switch shunting said positive feedback path from said circuit thereby providing a load independent voltage when in the first position and including said positive feedback path when in the second position, thereby providing a load independent current.

2. A converter circuit for providing either a load-independent voltage output or a load-independent current constant analog-type output, said circuit comprising an amplifier capable of receiving a voltage input and providing a voltage output, input resistive means connected to the input of said amplifier, feedback resistive means connected across said amplifier forming a negative feedback path thereacross, a positive feedback path operatively connected across said amplifier and feeding back a portion of the voltage output of said amplifier in the form of feedback voltage to the input of said amplifier, and loading resistive means connected to the output of said amplifier and having a pre-established resistance value with regard to a load current so that the voltage drop across said loading resistive means resulting from the input voltage and feedback voltage enables a constant current output from said sensing resistive means, said input resistive means, loading resistive means and amplifier forming a summer-inverter circuit.

3. The converter circuit of claim 2 wherein a second amplifier is in said positive feedback path.

4. A converter circuit for providing either a load-independent voltage output or a load-independent current constant analog-type output, said circuit comprising an amplifier capable of receiving a voltage input and providing a voltage output, input resistive means connected to the input of said amplifier, feedback resistive means connected across said amplifier forming a negative feedback path thereacross, a positive feedback path operatively connected across said amplifier and feeding back a portion of the voltage output of said amplifier in the form of feedback voltage to the input of said amplifier, loading resistive means connected to the output of said amplifier and having a preestablished resistance value with regard to a load current so that the voltage drop across said loading resistive means resulting from the input voltage and feedback voltage enables a constant current output from said loading resistive means, said input resistive means, amplifier and loading resistive means forming a summer-inverter circuit, and a switch operatively connected to said positive feedback path and to said sensing resistive means and having a first and second position, said switch shunting said positive feedback path and loading resistive means from said circuit thereby providing a load independent voltage when in the first position and including said positive feedback path and loading resistive means when in the second position, thereby providing a load independent current.

5. The converter circuit of claim 4 wherein a second amplifier is in said positive feedback path.

6. The converter concuit of claim 5 wherein each of said amplifiers is a high gain operational amplifier.

7. The converter circuit of claim 4 wherein said positive feedback path includes a resistive means.

8. The converter circuit of claim 4 wherein said positive feedback path includes a resistive means and where the resistance values of the resistive means in said positive feedback path and negative feedback path are equal.

9. The converter circuit of claim 4 wherein a second amplifier and feedback resistor connected in parallel therewith is included in said positive feedback path.

10. The converter circuit of claim 4 wherein a second amplifier is included in said positive feedback path and said second amplifier is provided with input and output resistors.

11. The converter circuit of claim 4 wherein said amplifier is a differential amplifier having a first input terminal connected to the positive feedback path and a negative input terminal for operative connection to an input voltage.

12. A converter circuit for providing either a load-independent voltage output or a load-independent current output, said circuit comprising an amplifier means for introducing an input voltage in said amplifier, a first and second resistor in said last-named means and having equal resistance values; said amplifier having means for providing a voltage output, a negative feedback path established across said amplifier and having a third resistor therein, a positive feedback path operatively established across said amplifier and feeding back a portion of the voltage output of said amplifier in the form of feedback voltage to the input of said amplifier, said positive feedback path having a fourth resistor therein, said third and fourth resistors having equal resistance values, loading resistive means connected to the output of said amplifier and having a preestablished resistance value with regard to a load current so that the voltage drop across said loading resistive means resulting from the input voltage and feedback voltage enables a constant current output from said loading resistive means, and a switch operatively connected to said positive feedback path and to said loading resistive means and having a first and second position, said switch shunting said positive feedback path and loading resistive means from said circuit thereby providing a load independent voltage when in the first position and including said positive feedback path and loading resistive means when in the second position, thereby providing a load independent current.

13. A converter circuit for providing either a load-independent voltage output or a load independent current output, said circuit comprising a first amplifier, a first feedback resistor across said first amplifier creating a negative feedback path, a first input resistor connected to the input of said first amplifier, a first output resistor connected to the output of said first amplifier, a switch connected to the output of said first amplifier, said switch having a first switch position connected across said output resistor to shunt said output resistor, a second amplifier having the input connected to the second position of said switch and the output connected to the input of said first amplifier thereby creating a positive feedback path across said first amplifier, a second input resistor and second output resistor connected to said second amplifier, and a second feedback resistor connected across said second amplifier, said switch also having a first switch position contact for grounding said positive feedback path so that when said switch is switched to a first position the positive feedback path is shunted from the circuit and said output resistor is shunted from the circuit thereby producing an output voltage independent of load impedance and when said switch is shifted to the second position, said positive feedback path and output resistor is included in the circuit thereby producing an output current independent of load impedance.

References Cited

UNITED STATES PATENTS

| | | | |
|---|---|---|---|
| 2,651,717 | 9/1953 | Uttley et al. | 330—104 X |
| 3,129,326 | 4/1964 | Balaban | 235—183 |
| 3,210,626 | 10/1965 | Wierzbicki | 318—18 |

NATHAN KAUFMAN, *Primary Examiner.*

U.S. Cl. X.R.

330—104